United States Patent Office 3,025,183
Patented Mar. 13, 1962

3,025,183
CURED ELASTOMER AND PROCESS OF MAKING SAME
Edward Lung Yuan, Cornwall, N.Y., assignor to E. I. du Pont de Nemours and Company, Wilmington, Del., a corporation of Delaware
No Drawing. Filed June 22, 1956, Ser. No. 593,017
6 Claims. (Cl. 117—126)

This invention relates to cured elastomeric copolymers of vinylidene fluoride and hexafluoropropene.

In a copending application S.N. 576,519, filed April 6, 1956, by Dean R. Rexford, there is disclosed a new elastomeric copolymer comprising from about 70% to 30% by weight of vinylidene fluoride and from about 30% to 70% by weight of hexafluoropropene. This elastomeric copolymer tends to cure to the completely insoluble form in a relatively short time and relatively low temperature with conventional curing agents, such as, e.g., benzoyl peroxide. Consequently when the elastomer is compounded on a two roll rubber mill, or other mixing equipment by blending with fillers, pigments, softeners, accelerators, curing agents, etc., the elastomer tends to cure prematurely during mixing and/or the subsequent calendering or shaping operations, which renders the compound unsuitable for further processing. This precuring during mixing and/or calendering is referred to as scorching. If the amount of curing agent is reduced to prevent scorching an unsatisfactory cure results.

An object of this invention is to provide a method of curing a compound comprising an elastomeric copolymer of about 70% to 30% vinylidene fluoride and about 30% to 70% hexafluoropropene, which does not precure or scorch during mixing and/or shaping such as, e.g., calendering. A still further object is to provide a controlled rate of cure for the copolymer of vinylidene fluoride and hexafluoropropene during processing such as, e.g., mixing and subsequent shaping operations, such as calendering or molding.

The objects of this invention are accomplished by mixing or blending dicumyl peroxide with a copolymer of about 70% to 30% by weight of vinylidene fluoride and about 30% to 70% by weight of hexafluoropropene, shaping the mixture and heating the shaped mixture to cure the coating. The heating step is preferably carried out at from about 300° F. to about 400° F. for a length of time sufficient to cure the copolymer to the point of insolubility in methyl ethyl ketone at room temperature. Further objects are accomplished by coating a fabric substrate with the mixture comprising the copolymer and dicumyl peroxide, and heating the coating sufficiently to cure it to the insoluble stage.

The data in the above table show the advantages of curing the copolymer with dicumyl peroxide in comparison with benzoyl peroxide. For example the dicumyl peroxide cured compositions exhibit superior retention of elastomeric properties on heat aging. Further, the dicumyl peroxide cured compositions lose less weight on heat aging than the same composition cured with benzoyl peroxide.

When other conventional peroxide curing agents, such as, e.g., ditertiary butyl peroxide and a mixture of equal parts of 2,4-dichlorobenzoyl peroxide and dibutyl phthalate were substituted for dicumyl peroxide in the composition of Example II and subjected to the same heat and pressure treatment there was essentially no curing of the polymer as evidenced by solubility of the resultant product in methyl ethyl ketone and no increase in tensile strength over the uncured polymer composition.

*Example V*

A high temperature and oil resistant gasket material was produced in accordance with the following procedure. The following composition was prepared:

| | Parts by weight |
|---|---|
| Copolymer reaction product of 50 pts. of vinylidene fluoride and 50 pts. of hexafluorpropene by weight | 100.0 |
| Zinc oxide | 10.0 |
| Dibasic lead phosphite | 10.0 |
| Hydrated silica | 20.0 |
| Dicumyl peroxide | 3.0 |
| Stearic acid | 0.5 |

The above ingredients were mixed until thoroughly dispersed on a water cooled two roll rubber mill. The milled compound was transferred to a three roll calender, where it was calendered onto each side of a base coated glass fabric.

The glass fabric was identified as E–CC–116, weighted 3.16 ounces per square yard, and the thread count was 60 x 58 ends per inch in warp and fill respectively. The glass fabric was base coated on each side with a 40% solution in methyl ethyl ketone of the same compound described above except the stearic acid was omitted. The 40% solution was applied to each side of the glass fabric in an amount sufficient to deposit about 1–2 ounces of non-volatile components per square yard with forced drying between each coat.

A film of the milled compound weighing about 8 ounces per square yard was calendered onto each side of the base coated fabric. The temperature of all calender rolls was about 170–190° F. During the mixing and calendering operations there was no scorching or pre-curing of the compounded elastomer. The calender coated glass fabric was drum cured at 400° F. for 16 hours.

The coating on the glass fabric was thermally stable for extended periods at temperatures up to 450° F. and for one week at 500–525° F. The coating was not substantially affected by aromatic or aliphatic hydrocarbon solvents and petroleum oils. The coated fabric was soft, resilient and rubber-like.

Heat and chemical resistant products can be made by

TABLE I

| EXAMPLE | I | II | III | IV |
|---|---|---|---|---|
| Composition—Parts By Weight: | | | | |
| Copolymer of vinylidene fluoride and hexafluoropropene [1] | 100 | 100 | 100 | 100 |
| Zinc Oxide | 10 | 10 | | |
| Diabasic Lead Phosphite | 10 | 10 | | |
| Dicumyl Peroxide | | 3 | | 3 |
| Benzoyl Peroxide | 3 | | 3 | |
| Initial Tensile Properties: | | | | |
| Tensile (p.s.i.) | 1,670 | 1,420 | 1,150 | 1,050 |
| Modulus 300% (p.s.i.) | 820 | 380 | 330 | 270 |
| Elongation (percent) | 450 | 670 | 530 | 770 |
| Hardness, Shore A | 62 | 64 | 57 | 60 |
| Heat Aging, 15 days at 400° F.: | | | | |
| Tensile (p.s.i.) | 900 | 1,500 | 810 | 1,180 |
| Modulus 300% (p.s.i.) | 610 | 410 | 240 | 270 |
| Elongation (percent) | 400 | 720 | 570 | 700 |
| Hardness, Shore A | 60 | 63 | 57 | 66 |
| Weight Loss (percent) | 7.8 | 5.5 | 3.5 | 1.5 |
| Heat Aging, 30 days at 400° F.: | | | | |
| Tensile (p.s.i.) | 920 | 1,450 | 680 | 1,150 |
| Modulus 300% (p.s.i.) | 700 | 440 | 240 | 280 |
| Elongation (percent) | 370 | 670 | 590 | 750 |
| Hardness, Shore A | 61 | 61 | 56 | 64 |
| Weight Loss (percent) | 8.9 | 6.5 | 3.6 | 2.0 |
| Heat Aging, 60 days at 400° F.: | | | | |
| Tensile (p.s.i.) | 1,090 | 1,460 | 520 | 970 |
| Modulus 300% (p.s.i.) | 610 | 430 | 200 | 160 |
| Elongation (percent) | 410 | 680 | 550 | 750 |
| Hardness, Shore A | 59 | 61 | 57 | 64 |
| Weight Loss (percent) | 15.3 | 9.6 | 5.8 | 4.3 |

[1] The copolymer was the reaction product of 60 parts of vinylidene fluoride and 40 parts hexafluoropropene. A small laboratory batch of each composition was mixed on a two roll rubber mill until all the ingredients were thoroughly dispersed and then press cured at 275° F. for 1 hr. and oven cured at 320° F. for 16 hours.

substituting polytetrafluoroethylene or asbestos fabrics for the glass fabric in the preceding example.

The advantage of resistance to scorching of the dicumyl peroxide containing calender compound of this invention was clearly illustrated by a Mooney viscosity test (ASTM 927–49T) which showed no increase in viscosity during a 20 minute test period at 250° F., using a small rotor; whereas a similar compound containing benzoyl peroxide in place of dicumyl peroxide showed a 10 point rise in Mooney viscosity during a 5 minute period at 250° F. using a small rotor. The slower curing rate of the dicumyl peroxide containing calender compound permits a longer mixing and calendering time before any appreciable curing is initiated. This is an important processing advantage.

The copolymers referred to in the preceding examples were prepared in accordance with the teaching set forth in copending application S.N. 576,519, filed April 6, 1956, by Dean R. Rexford, now abandoned.

The preferred amount of dicumyl peroxide is about 3% based on the weight of the copolymer. The preferred range is 2% to 5%, same weight basis. Useful products can be made with as little as 1% and as high as 10% of the dicumyl peroxide based on the weight of the copolymer. Amounts less than 1% do not give a sufficient cure in a practical length of time. Amounts greater than 10% do not contribute to the cure and introduce an excessive amount of a material which contributes to greater weight loss on aging.

In place of woven glass fabric non-woven glass fabric may be used as a substrate for the cured coatings. Other heat resistant fabrics, such as, e.g., asbestos and polytetrafluoroethylene, both woven and non-woven, are useful as substrates for the cured coatings of this invention in making high temperature and chemical resistant products. Useful products can also be made with cotton, nylon, polyethylene terephthalate and polyacrylonitrile fabrics, both woven and non-woven as the substrate for the cured coatings of this invention. Such products are particularly useful as chemical resistant clothing.

The copolymers useful in carrying out this invention are prepared by copolymerizing from 60 to 15 parts by weight of vinylidene fluoride with from 40 to 85 parts by weight of hexafluoropropene at temperatures of from 85° to 100° C. under autogenous pressure, preferably in the presence of a polymerization initiator. The resulting elastomeric composition is a copolymer containing from about 70% to 30% by weight of vinylidene fluoride units and from about 30% to 70% by weight of hexafluoropropene units.

While there are above disclosed but a limited number of embodiments of the structure, process and product of the invention herein presented, it is possible to produce still other embodiments without departing from the inventive concept herein disclosed, and it is desired therefore that only such limitations be imposed on the appended claims as are stated therein, or required by prior art.

The embodiments of the invention in which an exclusive property or privilege is claimed are defined as follows.

I claim:

1. The process of curing an elastomeric copolymer comprising from about 70% to 30% by weight of vinylidene fluoride and from about 30% to 70% by weight of hexafluoropropene which comprises heating said copolymer in the presence of 1% to 10% dicumyl peroxide based on the weight of the copolymer at a temperature from about 300° F. to about 400° F. for a length of time sufficient to cure said copolymer to the point of insolubility in methyl ethyl ketone at room temperature.

2. A fibrous fabric coated with the cured elastomeric copolymer obtained by the process of claim 1.

3. A coated fibrous fabric according to claim 2 in which the fabric is glass.

4. A coated fibrous fabric according to claim 2 in which the fabric is polytetrafluoroethylene.

5. A coated fibrous fabric according to claim 2 in which the fabric is asbestos.

6. A mixture of dicumyl peroxide and an uncured elastomeric copolymer comprising from about 70% to 30% by weight of vinylidene fluoride and from about 30% to 70% by weight of hexafluoropropene.

References Cited in the file of this patent

UNITED STATES PATENTS

| | | |
|---|---|---|
| 2,547,815 | Leendert | Apr. 5, 1951 |
| 2,549,935 | Sauer | Apr. 24, 1951 |
| 2,676,944 | Doak | Apr. 27, 1954 |
| 2,689,241 | Dittman | Sept. 14, 1954 |
| 2,816,089 | Willis | Dec. 10, 1957 |
| 2,820,776 | Robb et al. | Jan. 21, 1958 |
| 2,983,624 | Thompson | May 9, 1961 |

OTHER REFERENCES

Transactions of the Institution of the Rubber Industry, vol. 31, No. 6, December 1955. Braden, "Vulcanization of Rubber With Organic Peroxides—Part II," pages 155–165.

Metz et al.: "Studies on Heat Deterioration of Specially Prepared Natural Rubber Vulcanizates," "Journal Polymer Science," vol. II, No. 1 (1953), pages 83–92.